United States Patent
Ciarcia

(10) Patent No.: US 9,141,880 B2
(45) Date of Patent: Sep. 22, 2015

(54) SYSTEMS AND METHODS FOR RELATING IMAGES TO EACH OTHER BY DETERMINING TRANSFORMS WITHOUT USING IMAGE ACQUISITION METADATA

(71) Applicant: Eagle View Technologies, Inc., Bothell, WA (US)

(72) Inventor: Christopher Albert Ciarcia, Monroe, WA (US)

(73) Assignee: Eagle View Technologies, Inc., Bothell, WA (US)

( * ) Notice: Subject to any disclaimer, the term of this patent is extended or adjusted under 35 U.S.C. 154(b) by 0 days.

(21) Appl. No.: 14/046,702

(22) Filed: Oct. 4, 2013

(65) Prior Publication Data

US 2014/0099035 A1    Apr. 10, 2014

Related U.S. Application Data

(60) Provisional application No. 61/849,842, filed on Oct. 5, 2012.

(51) Int. Cl.
*G06K 9/62* (2006.01)
*G06K 9/00* (2006.01)

(52) U.S. Cl.
CPC .......... *G06K 9/6211* (2013.01); *G06K 9/00637* (2013.01)

(58) Field of Classification Search
USPC ......... 382/103, 106, 108, 109, 209, 216, 278; 345/419, 653, 611, 617, 621, 629
See application file for complete search history.

(56) References Cited

U.S. PATENT DOCUMENTS

| 6,741,757 | B1 | 5/2004 | Torr et al. |
| 7,463,368 | B2 * | 12/2008 | Morden et al. ............... 356/614 |
| 8,078,436 | B2 | 12/2011 | Pershing et al. |

(Continued)

FOREIGN PATENT DOCUMENTS

| WO | 2011/152895 A2 | 12/2011 |
| WO | 2012/037157 A2 | 3/2012 |

(Continued)

OTHER PUBLICATIONS

Pershing, "Systems and Methods for Estimation of Building Wall Area," U.S. Appl. No. 13/757,694, filed Feb. 1, 2013, 96 pages.

(Continued)

*Primary Examiner* — Yosef Kassa
(74) *Attorney, Agent, or Firm* — Seed IP Law Group PLLC

(57) ABSTRACT

Systems and methods for relating images to each other by determining transform functions between the images and the three-dimensional world coordinate system of the object depicted in the image, without using image acquisition metadata are disclosed. Points of interest are independently selected on each image. An initial transform function is applied to transform the points in the plane of one image to the plane of the other image. A Gaussian Mixture Model is then iteratively applied to the points to determine a best match, which then provides adjustments to the argument values of the transform function which is again applied to the points of interest on each image. This process repeats until the argument values converge to provide the resulting transform function. The resulting function can then be used to identify objects in the images in three dimensional space.

16 Claims, 14 Drawing Sheets

(56) References Cited

U.S. PATENT DOCUMENTS

| | | |
|---|---|---|
| 8,081,798 B2 * | 12/2011 | Paglieroni et al. ............ 382/103 |
| 8,088,436 B2 | 1/2012 | Gao et al. |
| 8,145,578 B2 | 3/2012 | Pershing et al. |
| 8,170,840 B2 | 5/2012 | Pershing |
| 8,209,152 B2 | 6/2012 | Pershing |
| 8,224,097 B2 * | 7/2012 | Matei et al. ................... 382/204 |
| 8,588,547 B2 * | 11/2013 | Giuffrida et al. ............. 382/284 |
| 8,630,510 B2 * | 1/2014 | Giuffrida et al. ............. 382/284 |
| 8,649,632 B2 * | 2/2014 | Neophytou et al. .......... 382/285 |
| 8,805,058 B2 * | 8/2014 | Zebedin ........................ 382/154 |
| 8,811,720 B2 * | 8/2014 | Seida ............................ 382/154 |
| 2004/0258327 A1 | 12/2004 | Cheatle et al. |
| 2012/0191424 A1 | 7/2012 | Pershing |
| 2013/0346020 A1 | 12/2013 | Pershing |
| 2014/0046627 A1 | 2/2014 | Pershing |

FOREIGN PATENT DOCUMENTS

| | | |
|---|---|---|
| WO | 2012/103193 A1 | 8/2012 |
| WO | 2014055953 A2 | 4/2014 |

OTHER PUBLICATIONS

Zhang et al., "A comparative study of curvature scale space and Fourier descriptors for shape-based image retrieval," *J. Vis. Commun. Image R. 14*: 41-60, 2003.

International Search Report and Written Opinion, mailed Aug. 18, 2014, for corresponding International Application No. PCT/US2014/014274, 11 pages.

* cited by examiner

Result of Analysis of all GMM Iterations for a
Particular Transform Function ╱— 70

| Ortho | Oblique | Probability of Match |
|---|---|---|
| 234 | 236 | 238 |
| [0] | 13 | 0.814 |
| [1] | 0 | 0.814 |
| [2] | 7 | 0.832 |
| [3] | 6 | 0.826 |
| [4] | 5 | 0.834 |
| [5] | 10 | 0.829 |
| [6] | 14 | 0.814 |
| [7] | 1 | 0.832 |
| [8] | 17 | 0.813 |
| [9] | 16 | 0.834 |
| [10] | 3 | 0.832 |
| [11] | 15 | 0.825 |
| [12] | 4 | 0.741 |
| [13] | 2 | 0.831 |
| [14] | 9 | 0.813 |
| [15] | 11 | 0.718 |
| [16] | 8 | 0.701 |
| [17] | 12 | 0.810 | orthogonal image point index | optimal oblique point index assignment | Relative associative cluster probability

*Fig. 11*

SYSTEMS AND METHODS FOR RELATING IMAGES TO EACH OTHER BY DETERMINING TRANSFORMS WITHOUT USING IMAGE ACQUISITION METADATA

CROSS REFERENCE TO RELATED APPLICATIONS

This application claims the benefit of U.S. Provisional Patent Application No. 61/849,842, entitled "SYSTEMS AND METHODS FOR POINT-TO-POINT REGISTRATION USING PERSPECTIVE IMAGERY FROM INDEPENDENT SOURCES WITHOUT IMAGE ACQUISITION METADATA," filed Oct. 5, 2012, which is incorporated herein by reference in its entirety.

BACKGROUND

1. Technical Field

This disclosure relates to automated systems and methods for relating to images of the same object together without using image acquisition metadata, and more particularly, to such systems and methods matching points between images to determine the transform between images.

2. Description of the Related Art

Generation of three dimensional (3D) models of structures, such as a roof of a building, from orthogonal and oblique perspective imagery (such as aerial imagery) has many applications. One such application is for generating measurements to providing roof repair and estimation reports. However, the sources of the aerial images may be varied and the images are often not accompanied with accurate data, or any data at all, associated with how the image is acquired, such as data indicating the position and orientation of the camera relative to the object in the photograph or the ground, look angle of the camera, longitude and latitude of various points in the photograph, distance of objects in the photograph from the camera, and aircraft telemetry data. Such data associated with how the image is acquired is referred to herein as "image acquisition metadata". Without this image acquisition metadata, it is more difficult to efficiently define the roof form/structure to generate a three-dimensional model of the roof.

Thus, efficient systems and methods for relating images to each other by determining transforms without using image acquisition metadata, particularly with orthogonal and oblique perspective imagery, is desired.

SUMMARY

Systems and methods are disclosed for relating images to each other by determining transform functions between the images and the three-dimensional world coordinate system of the object depicted in the image. This is accomplished without using image acquisition metadata. The transform functions depend upon argument values X, Y, Z, Sc, $\theta$, $\phi$, $\alpha$ and $\beta$, which are iteratively determined by comparing points in the images. He first image and a second image are received. Then, points of interest are independently selected on each image. An initial transform function is applied to transform the points of interest in the first image plane to the second image plane. A Gaussian Mixture Model is then applied to evaluate possible matches between the transformed first image points and the second image points. The result of the best match will also provide adjustments to the transform function arguments. This creates a more accurate transform function, which is again applied to the points of interest to determine a group of points with the best fit. This process repeats until the argument values converge to provide the resulting transform function. The transform function can then be used to identify objects in the images and in three-dimensional space.

BRIEF DESCRIPTION OF THE DRAWINGS

FIG. 11 is an example chart displaying the best match assignment of points in the first image to points in the second image.

DETAILED DESCRIPTION

Figure 1:
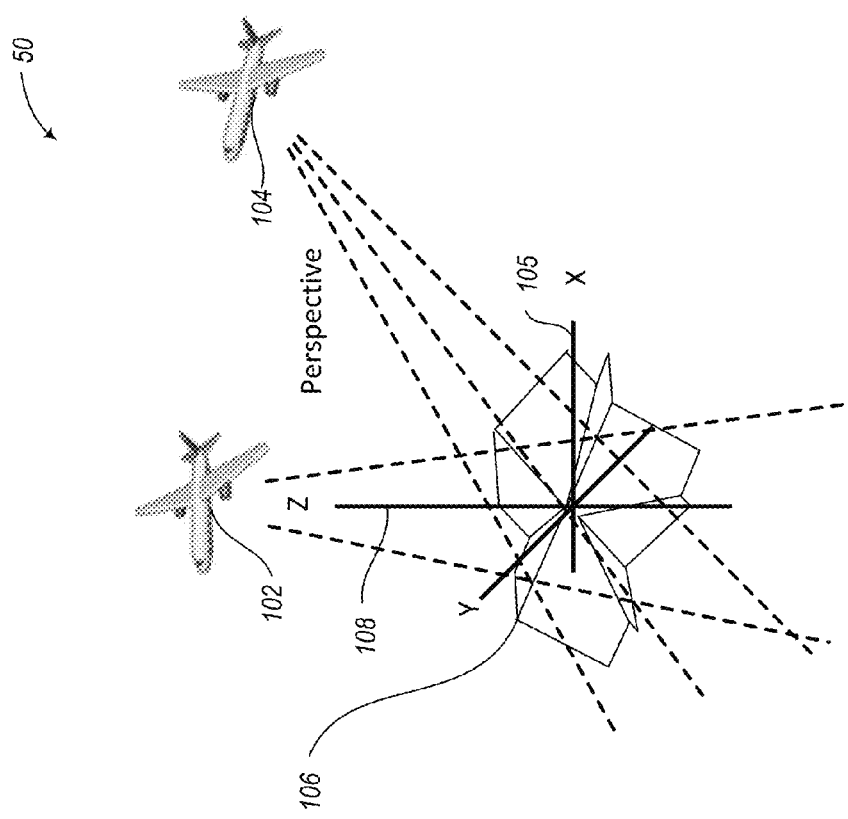
FIG. 1 is a diagram that illustrates an example embodiment of capturing two different aerial images of a house.

FIG. 1 shows diagram 50 that illustrates an example embodiment of capturing two different aerial images of a house. In this example, airplanes 102 and 104 are flying over the earth and capturing aerial imagery of the features on the ground below, specifically house 106. These airplanes may be different airplanes capturing aerial imagery at different times, or may be the same airplane flying over the ground and capturing images at different times. House 106 is located substantially below airplane 102, and the image captured from this angle is called an orthogonal ("ortho") image. Individual points along the features of house 106, such as a roof ridge line, valley, peak, gable, corner, or other can be identified in a real-world coordinate space 105, where each point on house 106 can be uniquely identified by an X, Y, Z coordinate. In this example, the X-Y plane is tangent to the surface of the earth, and perpendicular to the Z coordinate 108. The ortho image of house 106 is taken when airplane 102 was flying over the Z-axis 108 directly above the house 106. The aerial image captured by airplane 104 is taken at an angle to the house in a perspective view, also called an oblique image. Commonly, these oblique images are taken at or near a 45° angle in relation to the Z-axis 108.

For the purposes of the embodiment described herein, we will refer to the ortho image as the first image and the oblique image as the second image. The systems and methods described herein will relate these two images to each other, so that Transform Functions will be identified that map a point from each aerial image to a point on the other aerial image. Furthermore, the Transform Functions will be able to transfer points in the X, Y, Z real-world coordinate space 105 that describes the physical location of the object being photographed to points on either of the aerial images, and vice versa. The Transform Functions will be identified using only the picture data of the image and not using any metadata associated with the image.

Although for the purposes of this embodiment an ortho and oblique image of the roof of a house is used, the systems and methods described herein will work for any two images of an object taken from any direction, at any time.

Figure 2:
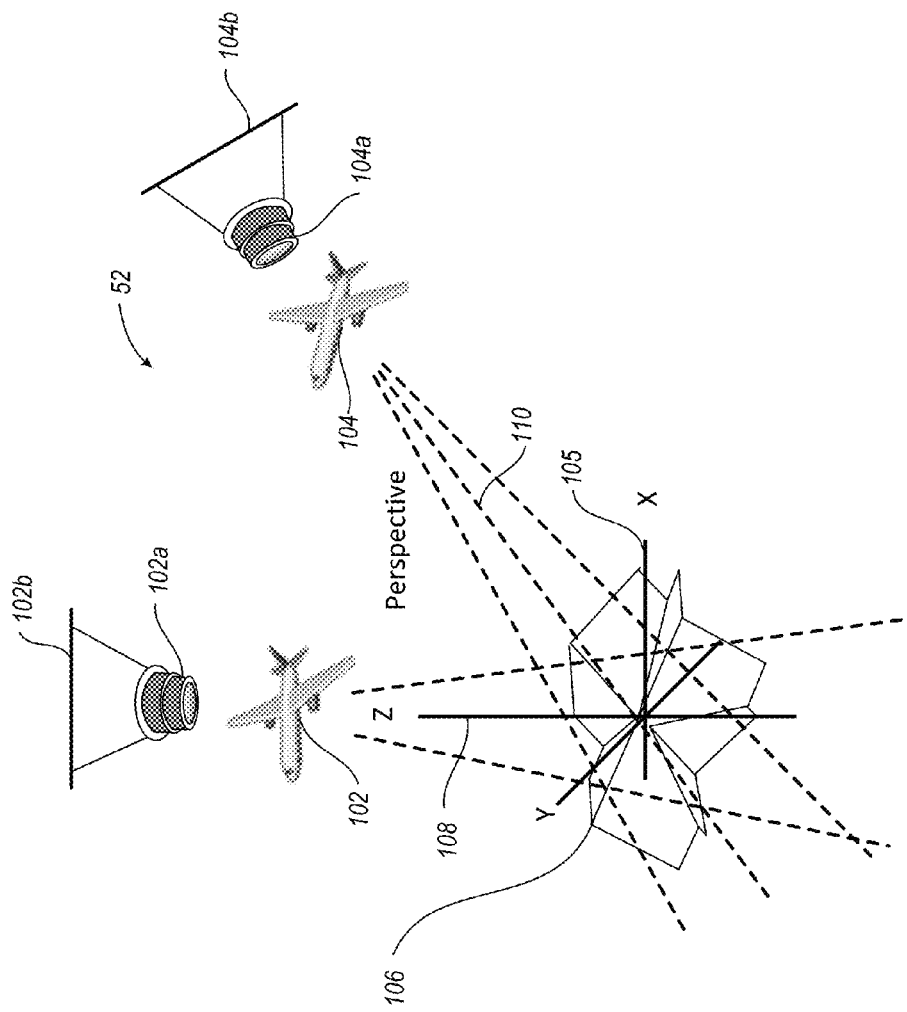
FIG. 2 is a diagram that illustrates an example of the operation of a lens and a photographic image plate within an aerial image capture camera system.

FIG. 2 shows diagram 52 that illustrates an example of the operation of the camera within an aerial image capture system. Airplanes 102 and 104 contain cameras beneath the airplanes able to take pictures of ground features such as house 106. Each camera contains a lens 102a, 104a which allows reflected light from the ground to pass through the lens, and project an image on photographic image plate 102b, 104b. The image on the photographic image plate is then digitized and stored as an aerial image. In the example of airplane 102, lens 102a is pointed downward, along the Z-axis 108. If image plate 102b is also perpendicular to the Z-axis 108, the image projected on plate 102b will have the same proportion as house 106 has with respect to the X-Y plane of the real-world coordinate system 105. However, in the example of airplane 104, lens 104a may be skewed, or plane 104 may have pitch and roll during the image capture process that may cause the image of house 106 captured on plate 104b to be distorted. In other words, the vector 110 from lens 104a to house 106 might not be perpendicular to the photographic image plate 104b. This will result in distortions, for example a different distance for a pixel on one side of the image compared to a pixel on the other side of the image.

Ordinarily, these distortions would be identified and corrected by using image capture metadata associated with each aerial image, mathematically adjusting for the distortions. However, the systems and methods disclosed herein are able to perform this adjustment by determining the proper Transformation Function, and to do it without image capture metadata.

Figure 3:
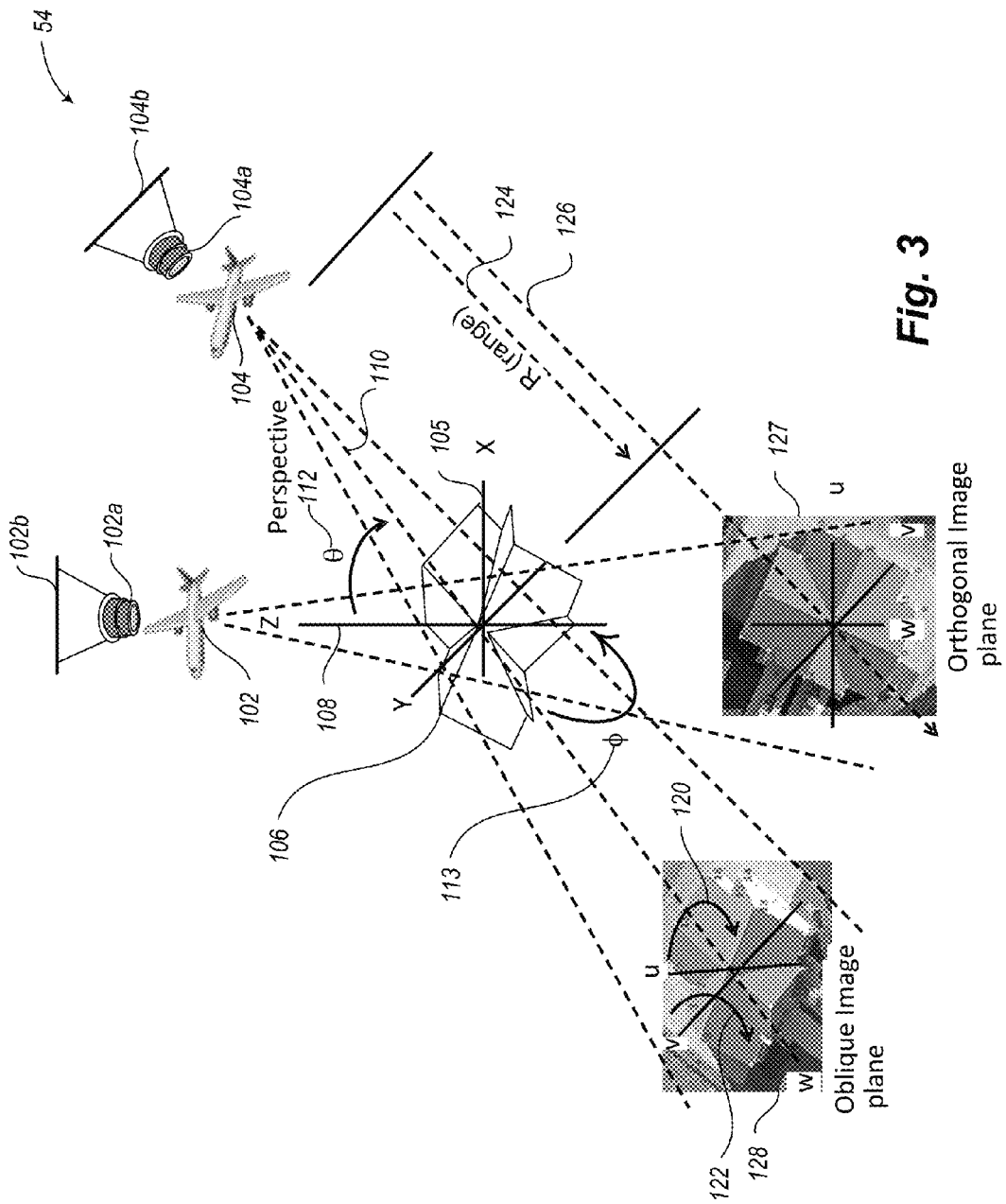
FIG. 3 is a diagram that illustrates an example of the mathematical representation of a photographic image plate as a vanishing point perspective projection of an image plane.

FIG. 3 shows diagram 54 that illustrates an example of the mathematical representation of the photographic image plates 102b and 104b as a vanishing point perspective projection of an image plane. Here, the ortho image captured by airplane 102 appears on the orthogonal image plane as image 127, which depicts the top down image of house 106. An individual point on image 127 can be identified by u, v coordinates within the coordinate system of image plane 127. The third dimension, w, will always correspond to the vector from camera lens 102a to house 106, in other words the Z-axis 108.

The oblique image captured by airplane 104 appears on the oblique image plane as image 128, which depicts an oblique view of house 106. This oblique view 128 may appear as a trapezoid given the roll and pitch of airplane 104 at the time the aerial oblique image was captured. In the coordinate system of oblique image plane 128, any point on the image can be identified by the u, v coordinates of the image plane 128. The third dimension, w, corresponds to the vector from camera lens 104a to house 106, i.e. vector 110.

With the mathematical model of the vanishing point perspective projection coordinate system in place, other factors that can be used to determine a Transform Function to transform points between the coordinate system of the oblique image plane 128, the coordinate system of orthogonal image plane of 127 and the real world, X, Y, Z coordinate system 105 of house 106 can be determined. These factors, once determined using the two image planes, will serve as arguments to the final Transform Function.

One factor is scale ("Sc"). The scale of an image on the image plane, for example the image on orthogonal image plane 127, is commonly known as a "zoom factor." This scale is a function of the focal length of lens 104a, and represented mathematically as the distance 124 between the airplane 104 and the house 106, divided by the distance 126 between the airplane 104 and the image plane 127.

Another factor is θ 112, which represents the angle between the vector 108, the vector from airplane 102 to house 106, and the vector 110, the vector between airplane 104 and oblique image plane 128. θ 112 in the current example represents the angle at which airplane 104 is flying compared to Z-axis 108. In other words, the angle at which the obliques images were taken. Note: in other examples where the first image is not an orthogonal image, there will be two θs: a Δθ representing the angle from the airplane taking the first image and the Z-axis, and θ representing the angle from the airplane taking the second image and the Z-axis.

Yet another factor is φ 113 which represents the rotation of, in this example, the oblique image plane vector 110 from airplane 104 with respect to the Z-axis 108. In this example, if airplane 104 had a φ of 10° and was taking oblique images of the North side of house 106, and airplane 104 later changed its direction to take an oblique image of the South side of house 106, then image 128 would have a φ value of 190°. Note, in other examples where the first image is not an orthogonal image then φ would be calculated based on the ray from airplane 102 to house 106.

The final two factors are α and β. As discussed above in FIG. 2, if the photographic image plate 104b is not perpendicular to ray 110, for example due to pitch and roll of airplane, then distortions will result in the image in the oblique image plane 128. These corrections may be adjusted for by making rotational adjustments to the u and v axes: the rotational adjustment to the u axis is α 120 and the rotational adjustment to the v axis is β 122.

The Transform Function

With Sc, θ, φ, α, β, there exists Transform Functions that will map points in three dimensional space between X, Y, Z in the real-world space 105; u, v, w in the oblique image (image one) plane space 128; and u, v, w in the orthogonal image (image two) plane space 127. Also, these Transform Functions can be used to give three dimensional coordinates of points in the in real-world space 105 using only points from the oblique image (image one) plane space 128 and from the orthogonal image (image two) plane space 127.

The challenge is to develop the Transform Function, coming up with function arguments, Sc, θ, φ, α, β, without using image metadata. This can be done by examining two different images of an object, choosing points of interest in each image, applying an initial Transform Function to transform the points on one image to points on the second image, evaluating the resulting match, and modifying the Transform Function arguments to make the function more accurate. The process is repeated until the Transform Function matches points within an acceptable tolerance, at which point the Transform Function may be used to identify points of the object (e.g. the roof of a building) in real-world coordinate space 105.

Figure 4:
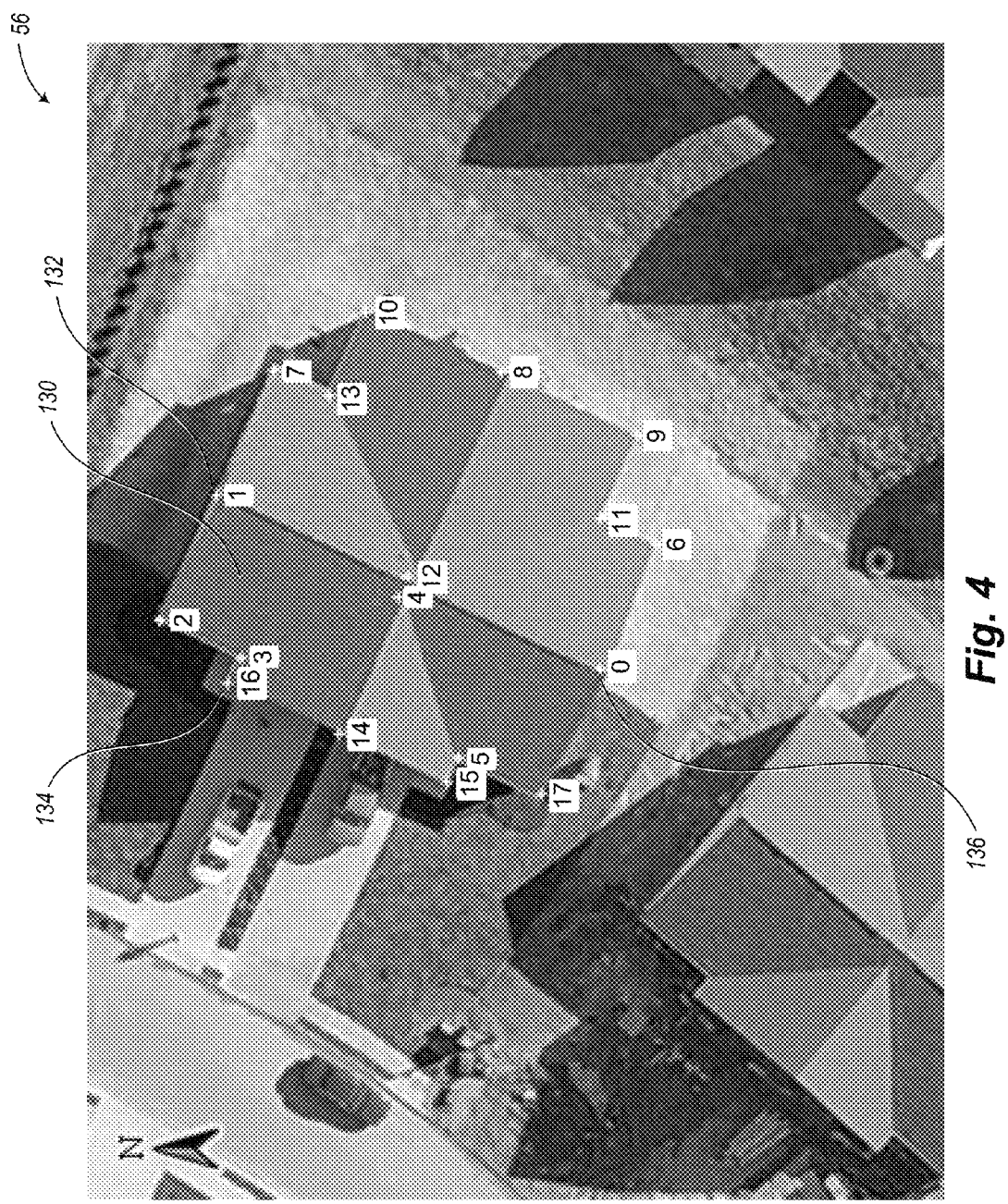
FIG. 4 is an example orthographic (top-down) image of a house.

FIG. 4 shows image 56, which is an example orthographic (top-down) image of the roof 130 of house 106.

Figure 5:
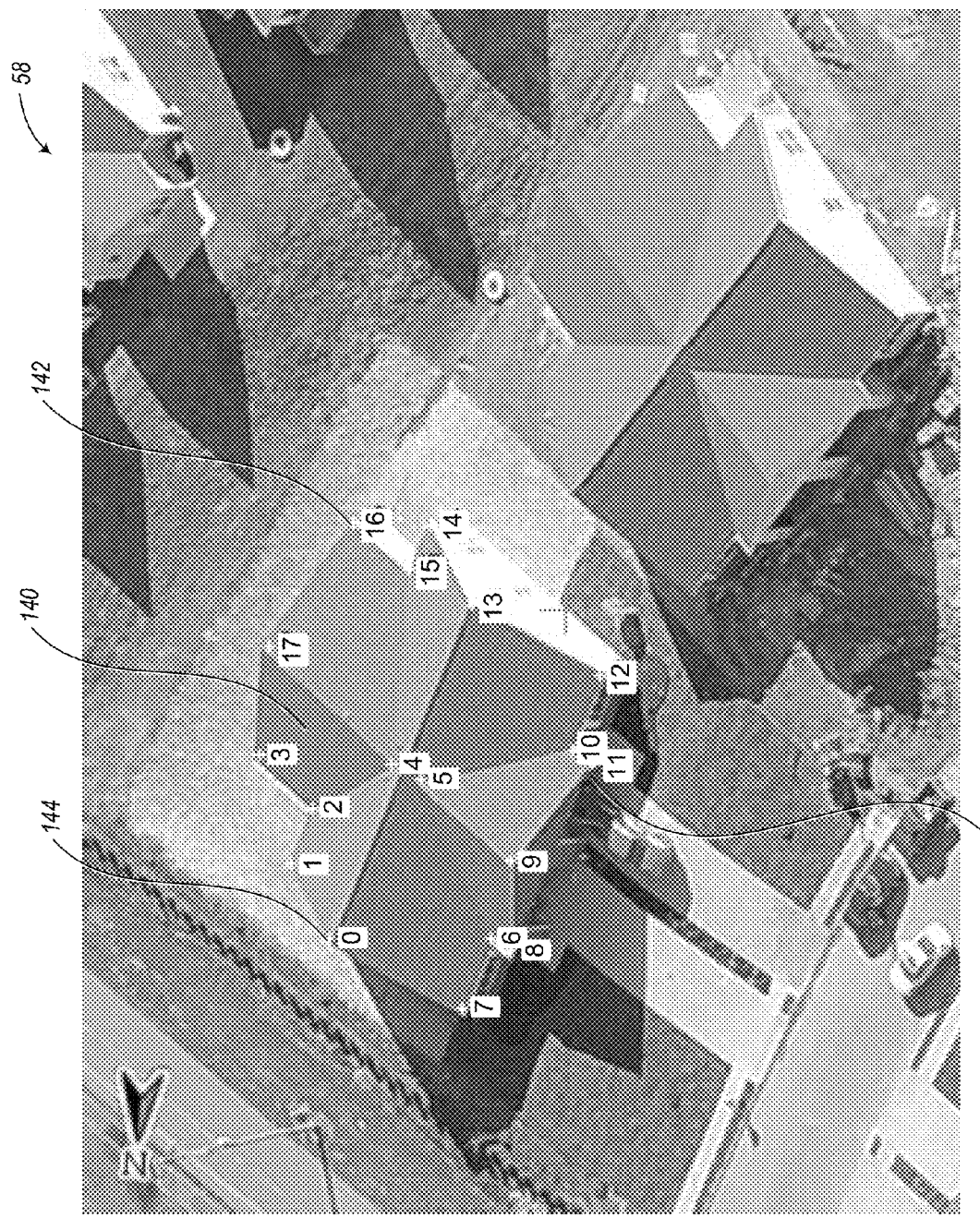
FIG. 5 is an example oblique (perspective) image of the house.

FIG. 5 shows image 58, which is an example oblique (perspective) image of the roof 140 of house 106.

Figure 6:
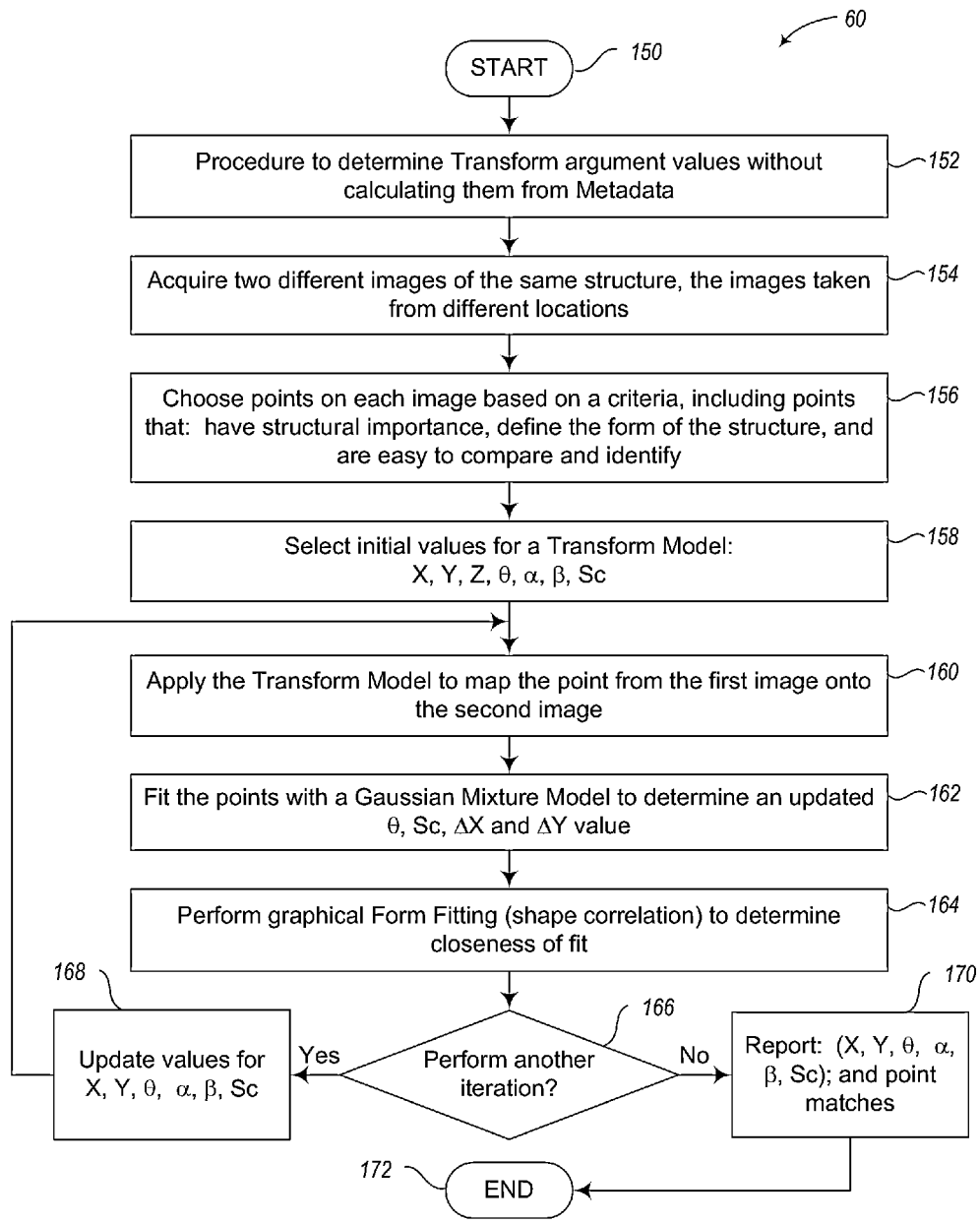
FIG. 6 is an example flow diagram of a method to determine a Transform Function without using metadata values.

FIG. 6 is an example flow diagram 60 of a method to determine a Transform Function without using metadata values. At 150, the method starts. At 152, the procedure to determine Transform Function argument values without the use of image metadata is identified. This method uses an iterative process to determine the Sc, $\theta$, $\phi$, $\alpha$ and $\beta$ arguments for the Transform Function.

At step 154, two different images of the same structure are acquired, each captured from a different location. Examples of these two images are image 56 from FIG. 4 and image 58 from FIG. 5.

At step 156, points are chosen on each image. These points should be chosen such that the points in each image gives spatial variance in the coordinate system of the picture. For example, choosing points that are spread apart from each other, that are not collinear and that identify points that likely represent different elevations in the real world coordinate space 105. In addition, points may be chosen that have structural importance, that help define the form of the structure, and that are otherwise likely to be easily identified and compared across to images. It is not necessary that all of the points chosen can be seen in both images. These points may be chosen either by a human operator viewing either one or both images at the same time looking for identifiable features to select as points, or points could be selected in a computer-based way. For example, by using known computer-vision techniques for feature detection including edge detection, corner detection, ridge detection and the like, brightness changes an image likely indicates a point of interest.

For example, in FIG. 4 image 56, 18 points were chosen in the ortho image to identify features of a roof. These points include the peak edge of a gable 136, an eave edge 134, an opposing eave edge 138, and another peak edge of a gable 132 at the opposite side of the house. Each of the 18 points chosen were given point identifier number being from 0 through 17. From FIG. 5 image 58, 18 points were chosen in the oblique image to identify features of a roof. These points include the corner eave 142, the peak edge of a gable 144 and lower gable eave edge 146. Each of the 18 points chosen were given point identifier numbers from 0 through 17. Note: the assigned numbers for identified points in each image do not correlate with each other. Also, note that the same number of points need not be chosen in each image, and also that different points may be chosen in each image, for example a tree may be selected in one image and not selected in the other image either by choice or because the tree may not be present in the second image.

At step 158, values for an initial Transform Function are selected. These values include X, Y, Z, Sc, $\theta$, $\phi$, $\alpha$ and $\beta$. Although these values may be chosen through initial guesses, in some embodiments it is often possible to estimate these values by looking at the image. In this example, we are identifying the initial Transform Function that best maps identified points in the ortho image 56 to points in the oblique image 58. Therefore, in this particular case because the transform is to an oblique image, the value of $\theta$ is likely close to 45°. In addition, because aerial imagery is used, it is likely that the $\alpha$ and $\beta$ values estimated at zero, the scale Sc is set to 1, and the value of $\phi$ is set at 0.

In one or more embodiments it is possible to get a more accurate initial value for $\theta$ by calculating the centroid, or geometric center, of the identified points in the ortho image 56 after applying the Transform Function using the initial values described above, and comparing the transformed ortho image centroid to the centroid of the identified points in the oblique image 58. If the two centroid values do not overlap, the value of $\theta$ is then adjusted, and the Transform Function with the new $\theta$ value is applied to the ortho image centroid and again compared to the oblique image centroid. This iterative process continues, adjusting $\theta$ until the centroid points are sufficiently close together. When this is accomplished, the last value of $\theta$ is used for the Transform Function in the subsequent steps.

At step 160, the Transform Function to the points is applied to the identified points on the ortho image (first image), which will translate those identified ortho points onto the oblique image plane.

At step 162, the two sets of points are fitted using a Gaussian Mixture Model ("GMM"). The result is a series of fits using different point matches, that includes the probabilities of the best point match fit and associated two-dimensional transformations. The results of the point matching includes updated values for $\phi$ (rotation), Sc (scale), and $\Delta x$ and $\Delta y$ values (translation) needed to adjust the points to the best match given the Transform Function used. This step is described in further detail in FIG. 7.

At step 164, graphical form-fitting is performed where the highest probability point matches determined from the previous step are converted to a graphical form, and shape correlation is performed on the resulting images to evaluate closeness of fit. This step is described in further detail in FIG. 8.

At step 166, the method determines whether another iteration should be performed, based on the closeness of fit determined from step 164. In some embodiments, this is measured by assessing how close the changes in output value in the GMM step are, or how quickly the changes go to zero.

If yes, then at step 168 the updated $\phi$ (rotation), Sc (scale), and $\Delta x$ and $\Delta y$ values (translation) values determined from the GMM step 162 are used to update new values for the updated Transform Function, and the method returns to step 160 two try the updated Transform Function against the identified points. If not, then at step 170 the final Transform Function is outputted, which includes values for arguments X, Y, Z, Sc, $\theta$, $\phi$, $\alpha$ and $\beta$, and the method stops 172.

Figure 7:
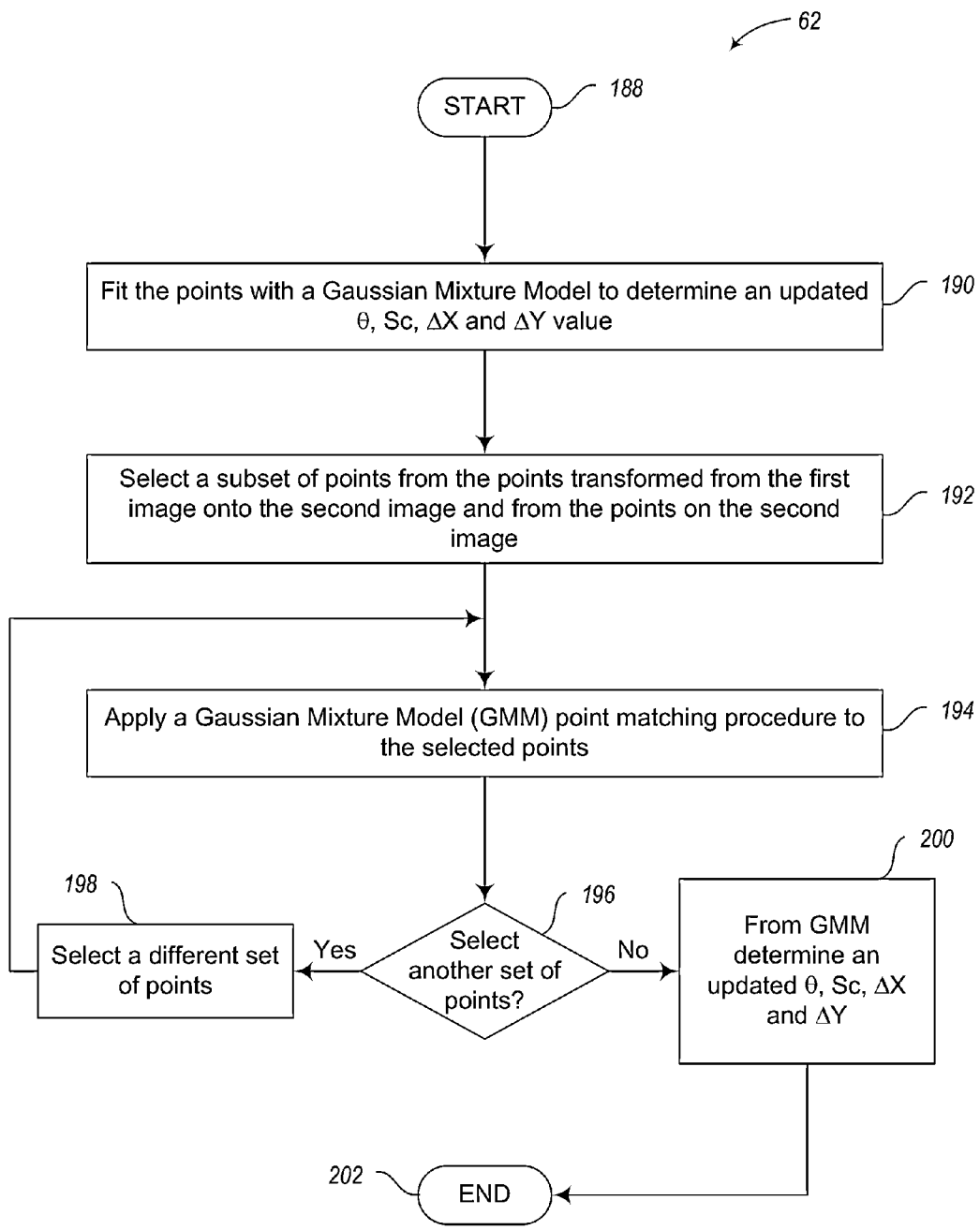
FIG. 7 is an example flow diagram of a method for performing iterations of a Gaussian Mixture Model to determine adjustments to the Transform Function resulting in a closer fit between points from one image transformed onto the points of the second image.

FIG. 7 is an example flow diagram 62 of a method for performing iterations of a Gaussian Mixture Model to determine adjustments to the Transform Function that will result in a closer fit between points from one image transformed onto the points of the second image. The method starts at 188.

At step 190, the GMM takes the points that were identified in the ortho image in FIG. 5 and translated onto the oblique image plane 128, and compares those points with the identified oblique image points in FIG. 4.

At step 192, a subset of points is selected from the ortho points that were translated into the oblique image plane 128. Note: not all of these ortho points need to be selected for an iteration of the GMM. In some embodiments, one or more points are excluded to encourage the GMM to attempt to make point matches that it would otherwise not attempt. These points will be compared to the set of points in the oblique image plane 128.

At step 194, the GMM point matching procedure is applied to the selected points. The GMM is a known algorithm that fits sets of points together using an iterative method. There are number of available prior art publications that described GMM in general.

At step 196, once the GMM has been run against those two sets of points, the method determines whether another subset of ortho points translated into the oblique image plane should be run against the oblique image points. In one or more embodiments, this may be determined, for example, by using all possible combination of points or limiting the number of iterations to a fixed number, such as 1000 iterations.

If another iteration is to be performed, then a different set of ortho points translated into the oblique image plane 128 are chosen, and the method returns to step 194. If no further iterations are to be performed, then this method ends at 202.

Figure 8:
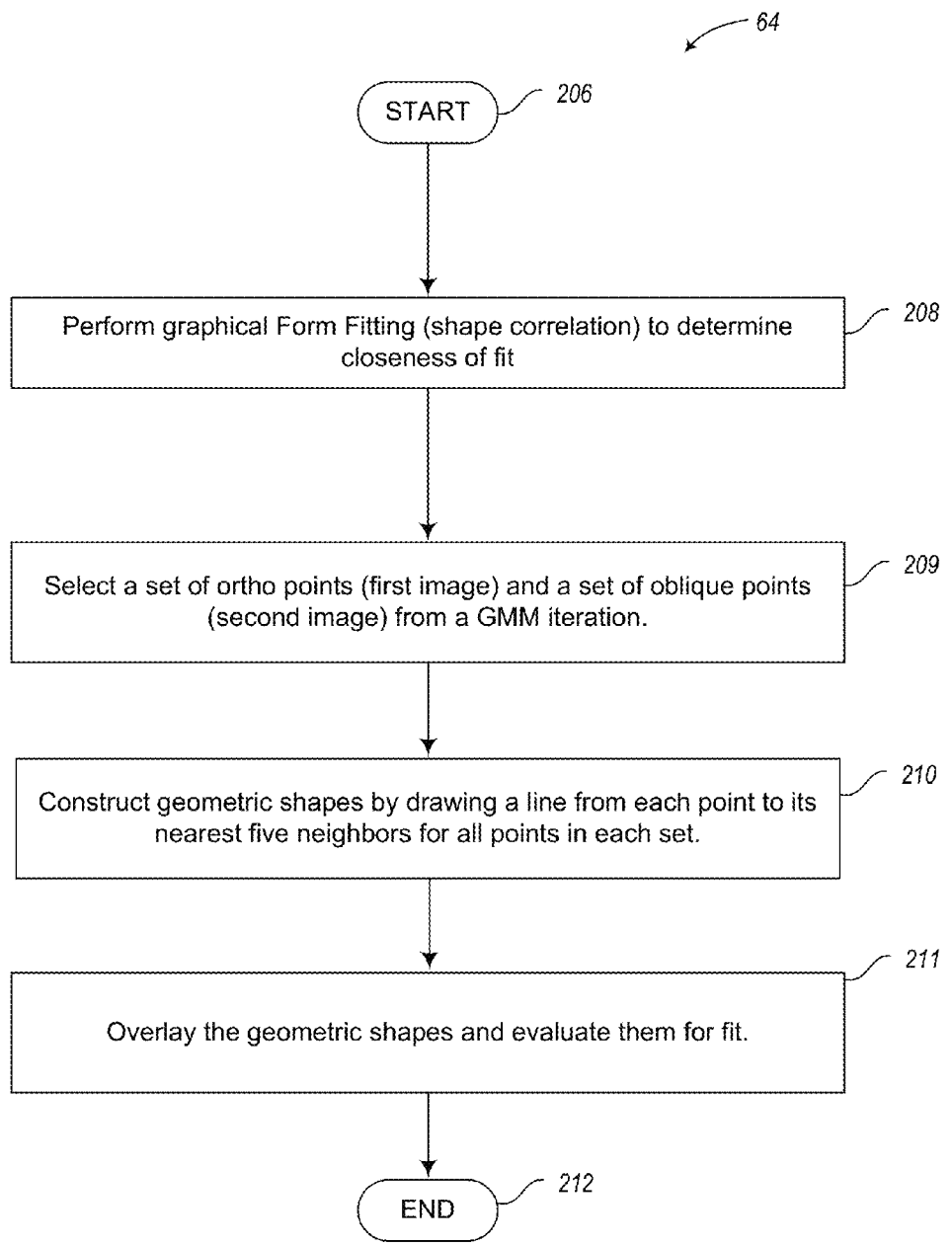
FIG. 8 is an example flow diagram of a method for verifying the point match from the Gaussian Mixture Model by connecting points and performing correlations on the resulting shapes.

FIG. 8 is an example flow diagram 64 of a method for verifying the point match from the Gaussian Mixture Model by connecting points and performing correlations on the resulting shapes.

At step 208, graphical form-fitting shape correlation is used to determine closeness of fit. At step 210, sets of points matches are chosen from previous GMM iterations that have provided best point fits.

Figure 9:
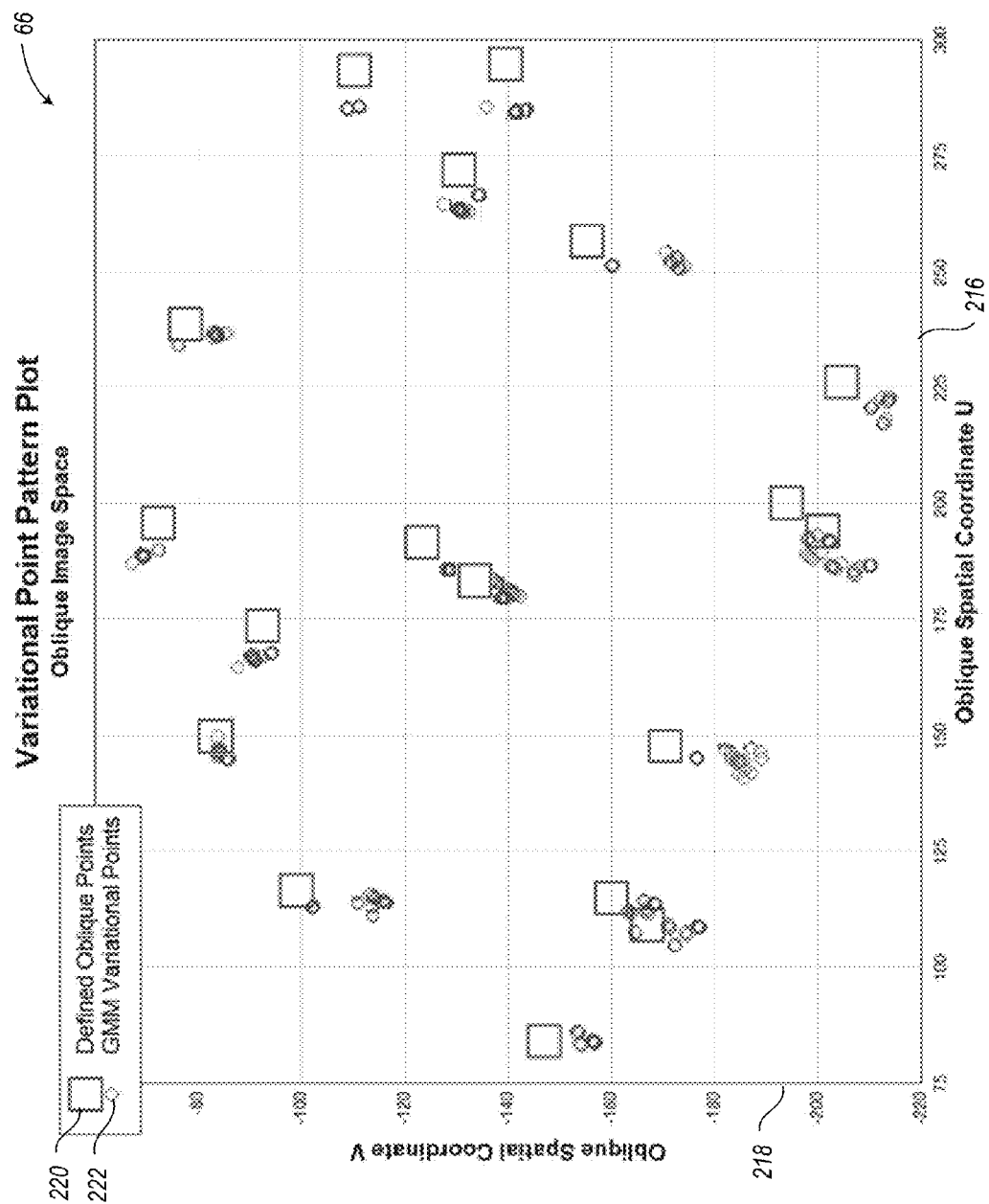
FIG. 9 is a diagram that illustrates one example of evaluating the relationship from the Gaussian Mixture Model iterations mapping multiple points transformed from one image onto points of the second image.

An example of the result of this fitting process is found in FIG. 9, which shows diagram 66 that shows a point pattern plot in oblique image space. The vertical axis 218 represents the "v" coordinate in the oblique image space; the horizontal axis 216 represents the "u" coordinate in the oblique image space. The squares 220 show the position of the defined points in the oblique image space. The circles 222 represent the location of the subset of ortho points that were transformed into the oblique image space using the current candidate arguments for the Transform Function.

Figure 10:
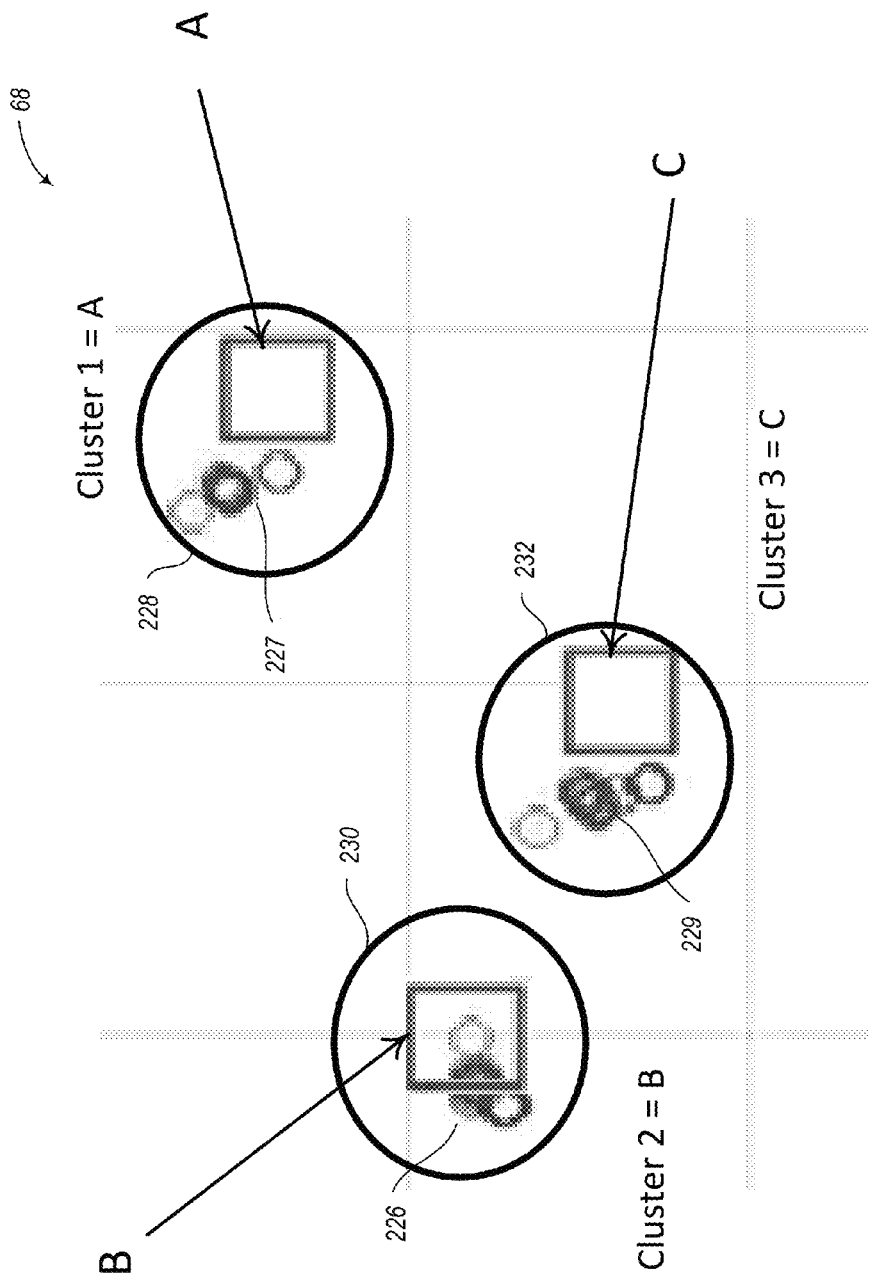
FIG. 10 is an enlargement of a portion of FIG. 9.

In FIG. 10, diagram 68 shows an enlargement of FIG. 9. Ring 228 shows a set of ortho points 227 that attempted to match an oblique point A, which is number 3 from FIG. 5. Ring 230 shows a set of ortho points 226 that attempted to match an oblique point B, which is number 1 from FIG. 5. Ring 232 shows a set of ortho points that attempted to match oblique point C, which is number 2 from FIG. 5. The cluster of transformed ortho points 229 do not perfectly overlap oblique point B. This indicates that in the next iteration of the Transform Function argument values, for example θ and φ need to be adjusted.

FIG. 11 shows an example chart 70 that displays the best match assignment of points in the first image to points in the second image after a series of iterations of attempted set matches through the GMM using the candidate Transform Function, and also gives a quality of fit measurement in terms of probability of match. On chart 70, column 234 contains the identification numbers given to the orthogonal points identified in FIG. 4. Column 236 contains the identification number given to the oblique points that were identified in FIG. 5 that have the highest probability match with the orthogonal point listed in column 234. Column 238 represents the probability of an accurate match between the two points, in this example in a range between 0 and 1 with one being the highest match. There are a number of different ways of assessing the quality of fit between a set of points. In this embodiment, the quality of fit was calculated by determining the average spread between those points that were most frequently matched over all iterations, and standard deviations calculated for these points. The probabilities represented in column 238 represents the likelihood, in any given iteration, that the spread between the given orthogonal and oblique point will fall within one standard deviation of the spread average. In this example, the probability that orthogonal point 0 matches oblique point 13 is 0.814 (81.4%).

Generally, it is preferred to have most, if not all, points to have a probability of match above 0.800, but it will be recognized that a few points, even in the best match, will likely have a probability in the 0.700 to 0.780 range. Of course, in many instances, there will be different points used in each image. For example, a first image may have 18 reference points and the second image only 15 reference points. In this case, there will be no match possible for three of the points. Also, there will be situations in which the selected points in each image are on different features, or can be seen in only one image, so a correct alignment will result in these reference points not matching. Therefore, in some cases, a proper alignment is achieved when the probability of a match for some points is quite low. The goal is to achieve the alignment using the iterative method disclosed herein. In some situations, depending upon reference point selection, a high probability match between as few as 5 to 6 points will be sufficient to provide accurate information for use in updating the Transformation Function arguments.

Continuing with FIG. 8, step 208, the iterations of the best-fit groupings for each set of ortho points and oblique points are converted to a series of graphical images as another check for closeness of fit. At step 209, multiple sets of ortho and oblique points from a GMM iteration are selected. At step 210, geometric shapes are created by drawing a line from each point in the point set to its nearest five neighbors. This is done for all points in each set. At step 211, the individual geometric shapes are overlaid and evaluated for fit. This step may be performed by a human operator, or by a computer-based vision recognition system. In some embodiments, the number of neighbors may be varied.

Figure 12:
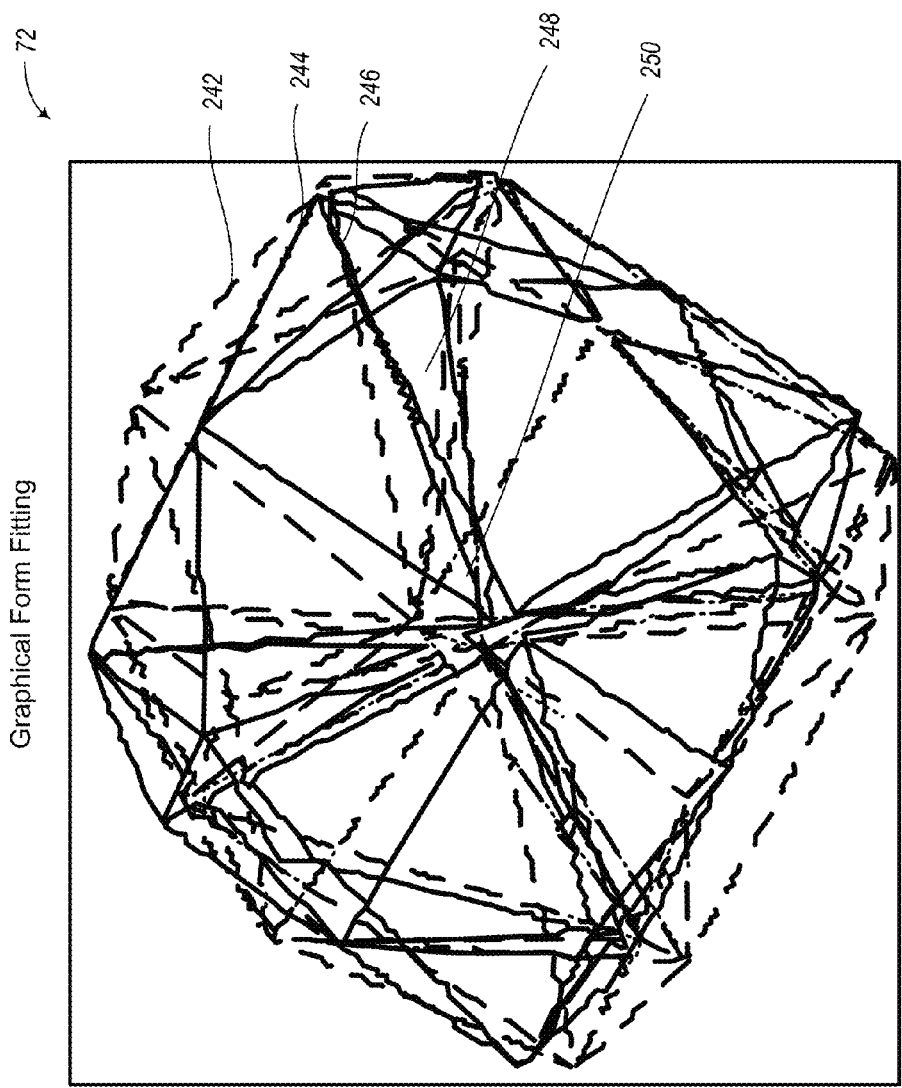
FIG. 12 is an example diagram showing a graphical representation for verifying the point match results from the Gaussian Mixture Model.

FIG. 12 contains diagram 72, which shows graphical form fitting by overlaying multiple graphical images including 242, 244, 246 over each other. These images may then be compared to each other for closeness of fit. For example, one comparison is to the extent that the centroid of each shape 250 overlaps. Another example is the closeness of fit of overlapping lines 248. The more closely the geometric shapes overlap, the better the fit is among the sets of points processed by the GMM. As a result, this indicates that the Transform Function, with the latest updated arguments, provides a good model to identify and translate points in and out of the real-world X, Y, Z coordinate space 105.

Figure 13:
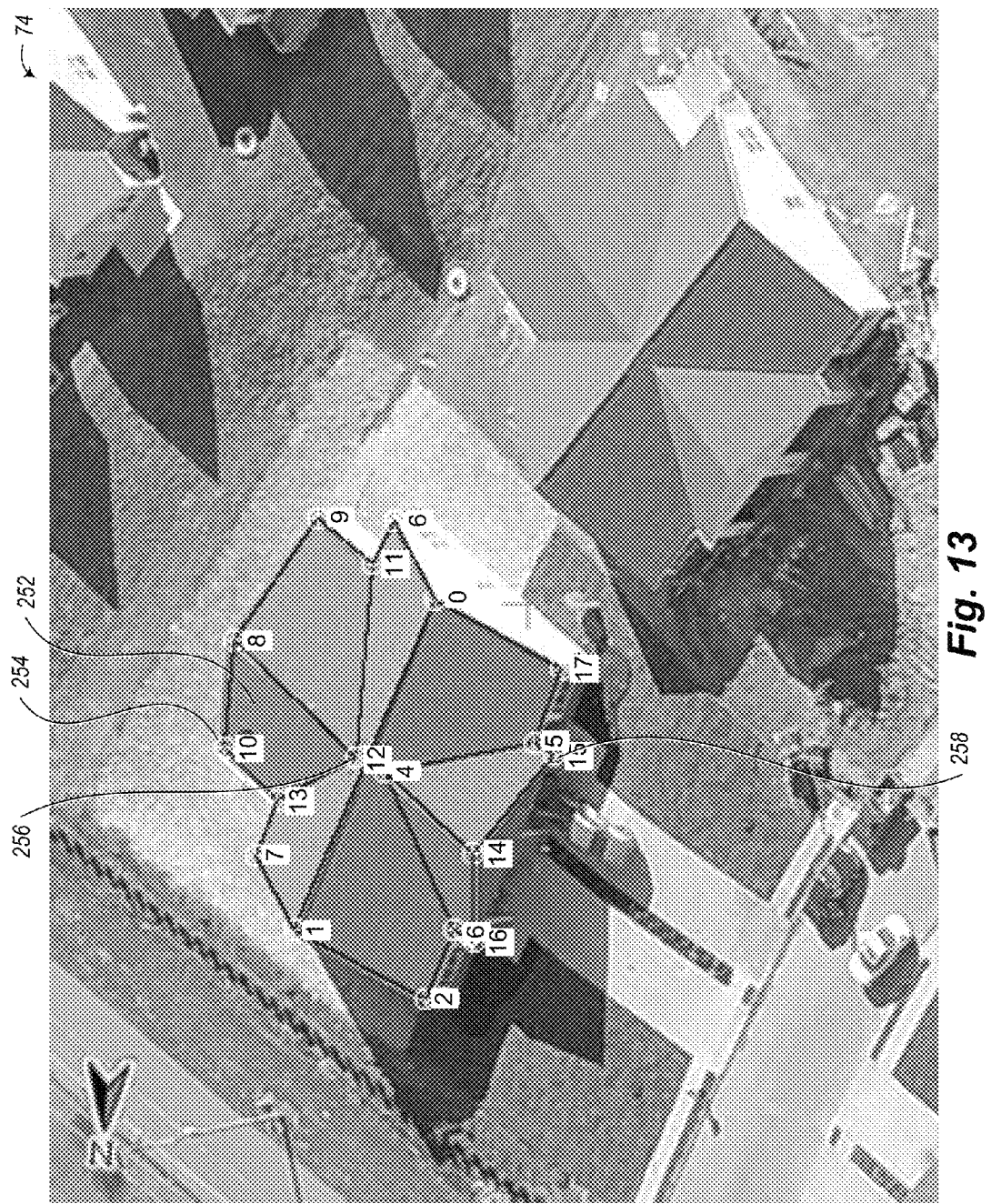
FIG. 13 is an example oblique view of a house, with points identified in the orthogonal view labeled on the oblique view.

FIG. 13 contains diagram 74, which shows an example mapping of a final-stage GMM iteration of point matches on roof 252. Here, using the oblique image from FIG. 5 containing the identified points the corresponding identified points in the ortho image from FIG. 4 are matched and labeled. At 254, the ortho identified point 10 is matched to the oblique identified point 3, at 256 the ortho identified point 2 has been matched to the oblique identified point 7, and at 258 the ortho identified point 15 has been matched to point 11.

The accurate matches between points identified in the first image (ortho) and second image (oblique) is the result of an accurate Transform Function that was determined using the systems and methods described herein, without the use of image capture metadata.

Example Application in a Roof Estimation System

Described below is an example of implementing, in a roof estimation system, point-to-point registration and elevation computation of a roof structure employing orthogonal and oblique perspective imagery from independent sources without acquisition metadata.

Figure 14:
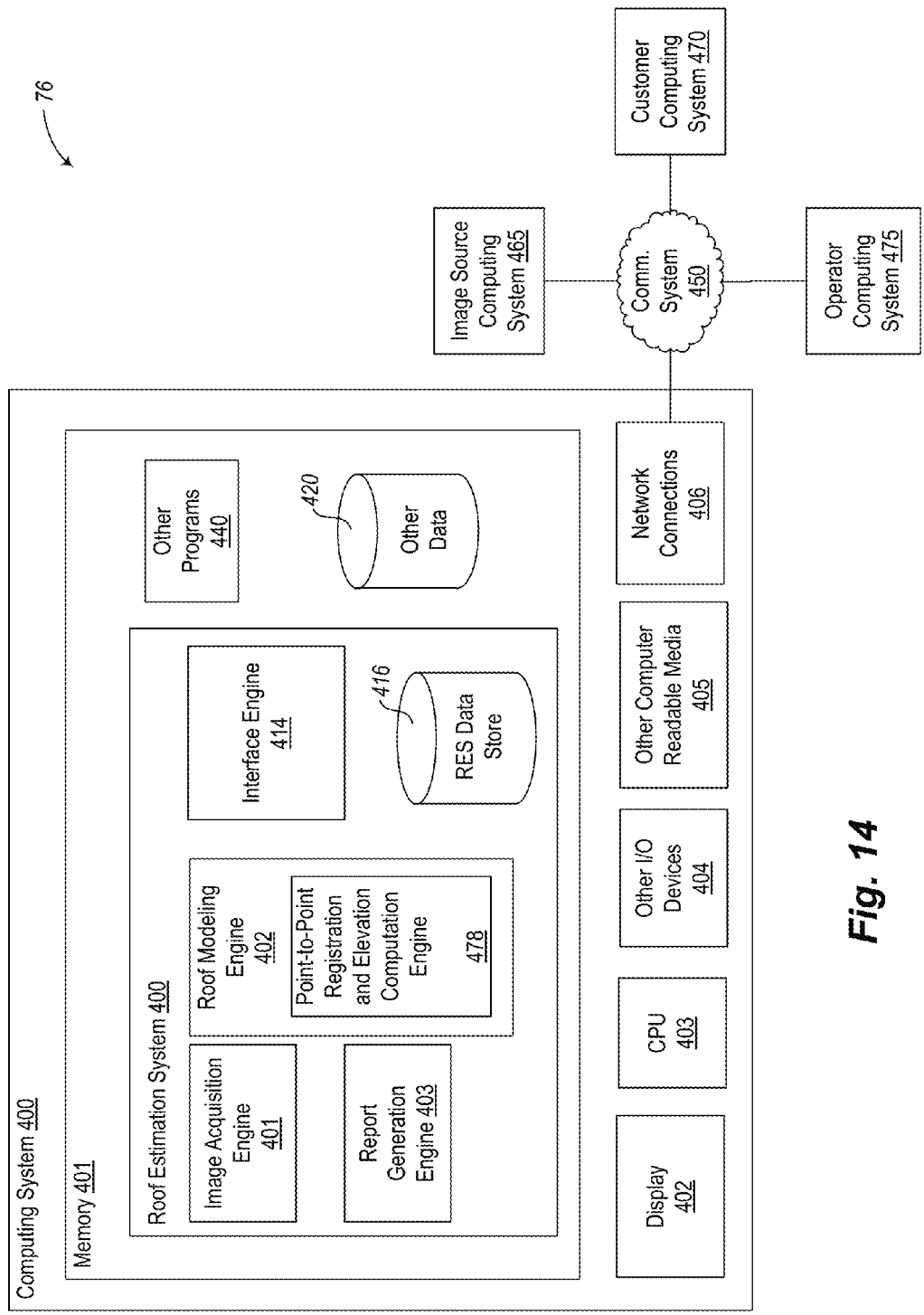
FIG. 14 is an example block diagram of a computing system for practicing embodiments of relating images to each other by determining transforms without using image metadata.

FIG. 14 is an example block diagram 76 of a computing system for practicing embodiments of a roof estimation system using point-to-point registration and elevation computation of a roof structure employing orthogonal and oblique perspective imagery from independent sources without acquisition metadata. FIG. 14 shows a computing system 400 that may be utilized to implement the Roof Estimation System ("RES") 400. One or more general purpose or special purpose computing systems may be used to implement the Roof Estimation System 400. More specifically, the computing system 400 may comprise one or more distinct computing systems present at distributed locations. In addition, each block shown may represent one or more such blocks as appropriate to a specific embodiment or may be combined with other blocks. Moreover, the various blocks of the Roof Estimation System 400 may physically reside on one or more machines, which use standard inter-process communication mechanisms (e.g., TCP/IP) to communicate with each other. Further, the Roof Estimation System 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, joystick, track pad, CRT or LCD display, and the like), other computer-readable media 405, and network connections 406. The Roof Estimation System 400 is shown residing in memory 401. In other embodiments, some portion of the contents, some of, or all of the components of the Roof Estimation System 400 may be stored on and/or transmitted over the other computer-readable media 405. The components of the Roof Estimation System 400 preferably execute on one or more CPUs 403 and generate roof estimate reports, as described herein. Other code or programs 440 (e.g., a Web server, a database management system, and the like) and potentially other data repositories, such as data repository 420, also reside in the memory 401, and preferably execute on one or more CPUs 403. Not all of the components in FIG. 14 are required for each implementation. For example, some embodiments embedded in other software do not provide means for user input, for display, for a customer computing system, or other components.

In a typical embodiment, the Roof Estimation System 400 includes an image acquisition engine 401, a roof modeling engine 402, a point-to-point registration and elevation computation engine 478 within or as part of the roof modeling engine 402, a report generation engine 403, an interface engine 414, and a roof estimation system data repository 416. Other and/or different modules may be implemented. In addition, the Roof Estimation System 400 interacts via a communication system 450 with an image source computing system 465, an operator computing system 475, and/or a customer computing system 470. Communication system 450 may utilize one or more protocols to communicate via one or more physical networks, including local area networks, wireless networks, dedicated lines, internets, the Internet, and the like.

The image acquisition engine 401 performs at least some of the functions described with respect to the processes described herein. In particular, the image acquisition engine 401 interacts with the image source computing system 465 to obtain one or more images of a building, and stores those images in the Roof Estimation System data repository 416 for processing by other components of the Roof Estimation System 400.

The roof modeling engine 402 performs at least some of the functions described with reference to FIGS. 1-13 above. In particular, the roof modeling engine 402 generates a model based on one or more images of a building that are obtained from the Roof Estimation System data repository 416 or directly from the image source computing system 465. As noted, model generation may be performed semi-automatically, based on at least some inputs received from the operator computing system 475.

In addition, at least some aspects of the model generation may be performed automatically. In particular, to generate the 3D model, the point-to-point registration and elevation computation engine 478 simulates the perspective change between an orthogonal and oblique view of a roof provided in the different acquired images by applying a convoluted vanishing point perspective projection VPPP model. In some embodiments, the point-to-point registration and elevation computation engine 478 performs registration and computation of point elevations within orthogonal (overhead) roof images based on the use of determining a proper Transformation Function by iterating through Gaussian Mixture Model (GMM) and evaluation using Graphical Form Fitting.

These automated and semi-automated techniques are further described with respect to FIGS. 1-13 above. After the roof modeling engine 402 generates a model, it stores the generated model in the Roof Estimation System data repository 416 for further processing by other components of the Roof Estimation System 400.

The report generation engine 403 generates roof reports based on models stored in the Roof Estimation System data repository 416. Generating a roof report may include preparing one or more views of a given 3D model of a roof, annotating those views with indications of various characteristics of the model, such as dimensions of sections or other features (e.g., ridges, valleys, etc.) of the roof, slopes of sections of the roof, areas of sections of the roof, etc. In some embodiments, the report generation engine 103 facilitates transmission of roof measurement information that may or may not be incorporated into a roof estimate report. For example, the roof generation engine 403 may transmit roof measurement information based on, or derived from, models stored in the Roof Estimation System data repository 416. Such roof measurement information may be provided to, for example, third-party systems that generate roof estimate reports based on the provided information.

The interface engine 414 provides a view and a controller that facilitate user interaction with the Roof Estimation System 100 and its various components. For example, the interface engine 414 may implement a user interface engine 404. The user interface engine 404 may provide an interactive graphical user interface that can be used by a human user operating the operator computing system 475 to interact with, for example, the roof modeling engine 402, to perform functions such as specifying regions of interest for automated roof detection. In at least some embodiments, access to the functionality of the interface engine 414 is provided via a Web server, possibly executing as one of the other programs 440.

In some embodiments, the interface engine 414 provides programmatic access to one or more functions of the Roof Estimation System 400. For example, the interface engine 414 provides a programmatic interface (e.g., as a Web service, static or dynamic library, etc.) to one or more roof estimation functions of the Roof Estimation System 400 that may be invoked by one of the other programs 440 or some other module. In this manner, the interface engine 414 facilitates the development of third-party software, such as user interfaces, plug-ins, adapters (e.g., for integrating functions of the Roof Estimation System 400 into desktop applications, Web-based applications, embedded applications, etc.), and the like. In addition, the interface engine 414 may be in at least some embodiments invoked or otherwise accessed via remote entities, such as the operator computing system 475, the image source computing system 465, and/or the customer computing system 470, to access various roof estimation functionality of the Roof Estimation System 400.

The Roof Estimation System data repository 416 stores information related the roof estimation functions performed by the Roof Estimation System 400. Such information may include image data 405, model data 406, and/or report data 407. Furthermore, the data repository 416 may include information related to automatic roof detection and/or image registration. Such information includes historical image data and the like. In addition, the Roof Estimation System data repository 416 may include information about customers, operators, or other individuals or entities associated with the Roof Estimation System 400.

In an example embodiment, components/modules of the Roof Estimation System 400 are implemented using standard programming techniques. For example, the Roof Estimation System 400 may be implemented as a "native" executable running on the CPU 403, along with one or more static or dynamic libraries. In other embodiments, the Roof Estimation System 400 is implemented as instructions processed by a virtual machine that executes as one of the other programs 440. In general, a range of programming languages known in the art may be employed for implementing such example embodiments, including representative implementations of various programming language paradigms, including but not limited to, object-oriented (e.g., Java, C++, C#, Matlab, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments execute concurrently and asynchronously, and communicate using message passing techniques. Equivalent synchronous embodiments are also supported by a Roof Estimation System implementation. Also, other functions could be implemented and/or performed by each component/module, and in different orders, and by different components/modules, yet still achieve the functions of the RES.

In addition, programming interfaces to the data stored as part of the Roof Estimation System 400, such as in the Roof Estimation System data repository 416, can be available by standard mechanisms such as through C, C++, C#, and Java APIs; libraries for accessing files, databases, or other data repositories; through scripting languages such as XML; or through Web servers, FTP servers, or other types of servers providing access to stored data. For example, the Roof Estimation System data repository 416 may be implemented as one or more database systems, file systems, memory buffers, or any other technique for storing such information, or any combination of the above, including implementations using distributed computing techniques.

Also, the example Roof Estimation System 400 can be implemented in a distributed environment comprising multiple, even heterogeneous, computer systems and networks. For example, in one embodiment, the image acquisition engine 401, the roof modeling engine 402, the report generation engine 403, the interface engine 414, and the data repository 416 are all located in physically different computer systems. In another embodiment, various modules of the Roof Estimation System 100 are hosted each on a separate server machine and are remotely located from the tables which are stored in the data repository 416. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like).

Furthermore, in some embodiments, some or all of the components of the Roof Estimation System are implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of the present disclosure. For example, the methods, systems, and techniques for point-to-point registration and elevation computation of a roof structure employing orthogonal and oblique perspective imagery from independent sources without acquisition metadata discussed herein are applicable to other architectures other than the illustrated architecture or a particular roof estimation system implementation. For example, such processes and system may be utilized to generate 3D models of other structures, or objects appearing in images. Also, the methods and systems discussed herein are applicable to differing network protocols, communication media (optical, wireless, cable, etc.) and devices (such as wireless handsets, electronic organizers, personal digital assistants, portable email machines, game machines, pagers, navigation devices such as GPS receivers, etc.). Further, the methods and systems discussed herein may be utilized by and/or applied to other contexts or purposes, such as by or for solar panel installers, roof gutter installers, awning companies, HVAC contractors, general contractors, and/or insurance companies.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method comprising:
receiving a first and a second image of an object, the images taken from different locations;
identifying the location of a set of points from the first image, the set of points indicating features of interest relative to a first image plane;
identifying the location of a set of points from the second image, the set of points indicating features of interest relative to a second image plane;
identifying argument values initially for a transform function, the transform function configured to map the location of the set of points relative to the first image plane to the location of the points relative to the second image plane;
iteratively refining the transform function arguments; and
outputting the transform function arguments.

2. The method of claim 1 wherein refining the transform function arguments further comprises:
applying the transform function with the argument values to map the location of a subset of the set of points from the first image in the first image plane to a location on the second image plane,
performing a Gaussian Mixture Model to fit the location of the subset of the set of points from the first image on the second image plane with the location of the set of points from the second image on the second image plane,
evaluating the fit of the Gaussian Mixture Model, and
updating the arguments of the transform function.

3. The method of claim 1 wherein the set of points indicating features of interest represents one or more of: corners of the roof and points of intersection of planar sections of the roof.

4. The method of claim 1 wherein the transform function is further configured to map the location of the set of points relative to the real-world three dimensional coordinate system of the object.

5. The method of claim 4 further comprising:
determining the height of one point in the set of points in the real-world three dimensional coordinate system of the object.

6. The method of claim 2 wherein evaluating the fit of the Gaussian Mixture Model further comprises:
creating a first graphical representation of the subset of the set of points from the first image on the first image plane;
creating a second graphical representation of the set of points from the second image; and
comprising the first graphical representation to the second graphical representation.

7. A computation machine comprising:
a computer processor; and
a memory coupled to the computer processor, wherein the memory has computer-executable instructions stored thereon that when executed by the computer processor, configure the computer processor to:
receive a first and a second image of an object, the images taken from different locations;
identify the location of a set of points from the first image, the set of points indicating features of interest relative to a first image plane;
identify the location of a set of points from the second image, the set of points indicating features of interest relative to a second image plane;
identify argument values initially for a transform function, the transform function configured to map the location of the set of points relative to the first image plane to the location of the points relative to the second image plane;
iteratively refine the transform function arguments; and
output the transform function arguments.

8. The computation machine of claim 7 wherein the set of points indicating features of interest represent one or more of: corners of the roof and points of intersection of planar sections of the roof.

9. A non-transitory computer readable medium having computer executable instructions thereon that, when executed, cause a computer processor to perform the following:
receiving a first and a second image of an object, the images taken from different locations;
identifying the location of a set of points from the first image, the set of points indicating features of interest relative to a first image plane;
identifying the location of a set of points from the second image, the set of points indicating features of interest relative to a second image plane;
identifying argument values initially for a transform function, the transform function configured to map the location of the set of points relative to the first image plane to the location of the points relative to the second image plane;
iteratively refining the transform function arguments; and
outputting the transform function arguments.

10. A method comprising:
receiving a first and a second image of an object, the images taken from different locations;
identifying the location of a set of points from the first image, the set of points indicating features of interest relative to a first image plane;
identifying the location of a set of points from the second image, the set of points indicating features of interest relative to a second image plane;
identifying argument values initially for a transform function, the transform function configured to map the location of the set of points relative to the first image plane to the location of the points relative to the second image plane;
iteratively refining the transform function arguments by carrying out the following steps:
applying the transform function with the argument values to map the location of a subset of the set of points from the first image in the first image plane to a location on the second image plane,
performing a Gaussian Mixture Model to fit the location of the subset of the set of points from the first image on the second image plane with the location of the set of points from the second image on the second image plane,
evaluating the fit of the Gaussian Mixture Model, and
updating the arguments of the transform function; and
outputting the updated arguments of the transform function.

11. The computer-implemented method of claim 10, wherein evaluating the fit of the Gaussian Mixture Model further comprises:
creating a first graphical representation of the subset of the set of points from the first image on the first image plane;

creating a second graphical representation of the set of points from the second image; and comparing the first graphical representation to the second graphical representation.

12. The computation machine of claim 7, wherein the transform function is further configured to map the location of the set of points relative to the real-world three dimensional coordinate system of the object.

13. The computation machine of claim 12, further comprising:

determine the height of one point in the set of points in the real-world three dimensional coordinate system of the object.

14. The non-transitory computer readable medium of claim 9, wherein the set of points indicating features of interest represent one or more of: corners of the roof and points of intersection of planar sections of the roof.

15. The non-transitory computer readable medium of claim 9, wherein the transform function is further configured to map the location of the set of points relative to the real-world three dimensional coordinate system of the object.

16. The non-transitory computer readable medium of claim 15 further comprising:

determining the height of one point in the set of points in the real-world three dimensional coordinate system of the object.

* * * * *